(12) United States Patent
Parfitt

(10) Patent No.: US 7,646,230 B2
(45) Date of Patent: Jan. 12, 2010

(54) DEVICES, SYSTEMS, AND METHODS FOR REDUCING SIGNALS

(75) Inventor: Steven Perry Parfitt, Johnson City, TN (US)

(73) Assignee: Siemens Industry, Inc., Alpharetta, GA (US)

( * ) Notice: Subject to any disclaimer, the term of this patent is extended or adjusted under 35 U.S.C. 154(b) by 11 days.

(21) Appl. No.: 12/205,191

(22) Filed: Sep. 5, 2008

(65) Prior Publication Data

US 2009/0082882 A1 Mar. 26, 2009

Related U.S. Application Data

(60) Provisional application No. 60/994,749, filed on Sep. 21, 2007, provisional application No. 60/994,727, filed on Sep. 21, 2007.

(51) Int. Cl.
*H03H 11/26* (2006.01)
(52) U.S. Cl. .................. 327/265; 327/271; 327/272; 327/277; 327/281; 713/502
(58) Field of Classification Search ......... 327/261–265, 327/270–272, 276–278, 281; 713/502
See application file for complete search history.

(56) References Cited

U.S. PATENT DOCUMENTS

| | | | |
|---|---|---|---|
| 4,275,455 A | 6/1981 | Bartlett | |
| 4,715,050 A * | 12/1987 | Tanaka et al. | ............... 375/362 |
| 4,771,403 A | 9/1988 | Maskovyak et al. | |
| 5,095,232 A * | 3/1992 | Hirano et al. | ............... 327/286 |
| 5,727,170 A | 3/1998 | Mitchell | |
| 5,802,389 A | 9/1998 | McNutt | |
| 5,822,615 A | 10/1998 | Yamashita et al. | |
| 6,594,529 B1 | 7/2003 | Boggs | |
| 7,496,779 B2 * | 2/2009 | Miller | ......................... 713/500 |
| 2001/0037491 A1 * | 11/2001 | Boggs et al. | .................... 717/4 |
| 2003/0123590 A1 | 7/2003 | Saitou et al. | |
| 2005/0206427 A1 * | 9/2005 | Yuasa et al. | ................ 327/262 |
| 2005/0225365 A1 * | 10/2005 | Wood | ......................... 327/141 |
| 2006/0079970 A1 | 4/2006 | Ward | |

* cited by examiner

*Primary Examiner*—Vibol Tan
*Assistant Examiner*—Jason Crawford
(74) *Attorney, Agent, or Firm*—Jose de la Rosa

(57) ABSTRACT

Certain exemplary embodiments can provide a system, which can comprise a circuit adapted to cause an actuation of an output device according to a control output. The control output can be generated comprising a control signal, the control signal extracted from a sequence of clock pulses. The sequence of clock pulses can comprise the control signal.

21 Claims, 11 Drawing Sheets

6000

7000

U.S. Pat. No. 7,646,230 B2

DEVICES, SYSTEMS, AND METHODS FOR REDUCING SIGNALS

CROSS-REFERENCES TO RELATED APPLICATIONS

This application claims priority to, and incorporates by reference herein in its entirety, pending U.S. Provisional Patent Application Ser. No. 60/994,749, filed 21 Sep. 2007 and pending U.S. Provisional Patent Application Ser. No. 60/994,727, filed 21 Sep. 2007.

BACKGROUND

U.S. Pat. No. 6,594,529 (Boggs), which is incorporated by reference herein in its entirety, allegedly discloses a "programmable logic controller with enhanced and extended the capabilities. A digital input filter implement filters with considerable less logic by simulating the action of a capacitor being driven by a constant current source whose output voltage is sensed by a comparator with a large amount of hysterisis. A pulse catch circuit captures the input pulse even though the update occurs between scan cycles. A pulse output controller includes a hardware pipeline mechanism to allow for smooth, hardware-controlled transitions from wave-form to wave-form. A free port link allows the user to control the port either manually or by operation of a user program. In order to provide higher performance for communication using PPI protocol, the PLC includes a built-in protocol. An n-bit modem protocol ensures data integrity without use of a parity type data integrity system. A hide instruction protects proprietary software by encrypting the sensitive code and decrypting the code during compilation and, thereafter, re-encrypting the code. A system function call allows the user to create and/or download new PLC functions and implement them as PLC operating system functions. An STL status function debugs programs during run-time and while the program is executing. A micro PLC arrangement provides compact size and efficiency." See Abstract.

U.S. Pat. No. 5,802,389 (McNutt), which is incorporated by reference herein in its entirety, allegedly discloses an "expansion module address method and apparatus for a Programmable Logic Controller (PLC) is taught. Briefly stated, a PLC base unit sends an address to an expansion module or modules attached thereto. Each expansion module takes the address number it receives and considers it to be its own address number. Unless the number presented to it is a zero, the expansion module decrements the number and passes it onto the next module. Thereby each module knows its own address. Each expansion module has contained therein a plurality of address and data lines which are common to all modules with the exception of one address line which is interrupted by each module circuitry, which is used to decrement the address number and then passes it along the interrupted address line to the next module." See Abstract.

SUMMARY

Certain exemplary embodiments can provide a system, which can comprise a circuit adapted to cause an actuation of an output device according to a control output. The control output can be generated comprising a control signal, the control signal extracted from a sequence of clock pulses. The sequence of clock pulses can comprise the control signal.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments can provide a system, which can comprise a circuit adapted to cause an actuation of an output device according to a control output. The control output can be generated comprising a control signal, the control signal extracted from a sequence of clock pulses. The sequence of clock pulses can comprise the control signal.

Communications between a programmable logic controller and an Input/Output system can be transmitted via a signal interface. Via the signal interface, a signal that comprises a clock sub-signal, a data sub-signal, and/or a control sub-signal can be used to transfer information between the programmable logic controller and an Input/Output system. The clock sub-signal can provide temporal information regarding the signal, the data sub-signal can comprise communicated information, and the control sub-signal can be a framing signal indicative of a completion of a register transfer.

The control sub-signal can be integrated into the clock sub-signal and can be recovered via a set of circuits that can comprise a counter, combinatorial logic, a pulse high detector, and/or a pulse low detector. The pulse high detector, and/or the pulse low detector can be used to detect the control sub-signal via differentiation of short length pulses from pulses that have a longer length. The counter can provide the clock sub-signal, the data sub-signal, and a count of pulses to the combinatorial logic. The combinatorial logic can provide an initiation signal that resets the counter at the end of the signal. The combinatorial logic can combine information from the counter, the pulse high detector, and/or the pulse low detector to form the signal.

Certain exemplary embodiments can reduce a count of signals that pass through isolation devices, which can be helpful in constraining costs of a programmable logic controller system. Certain exemplary embodiments can reduce a count of isolation devices via integration of a control sub-signal and a clock sub-signal to form an integrated signal. The control sub-signal can be extracted from the clock signal after the signal has passed through an isolation device.

Figure 1:
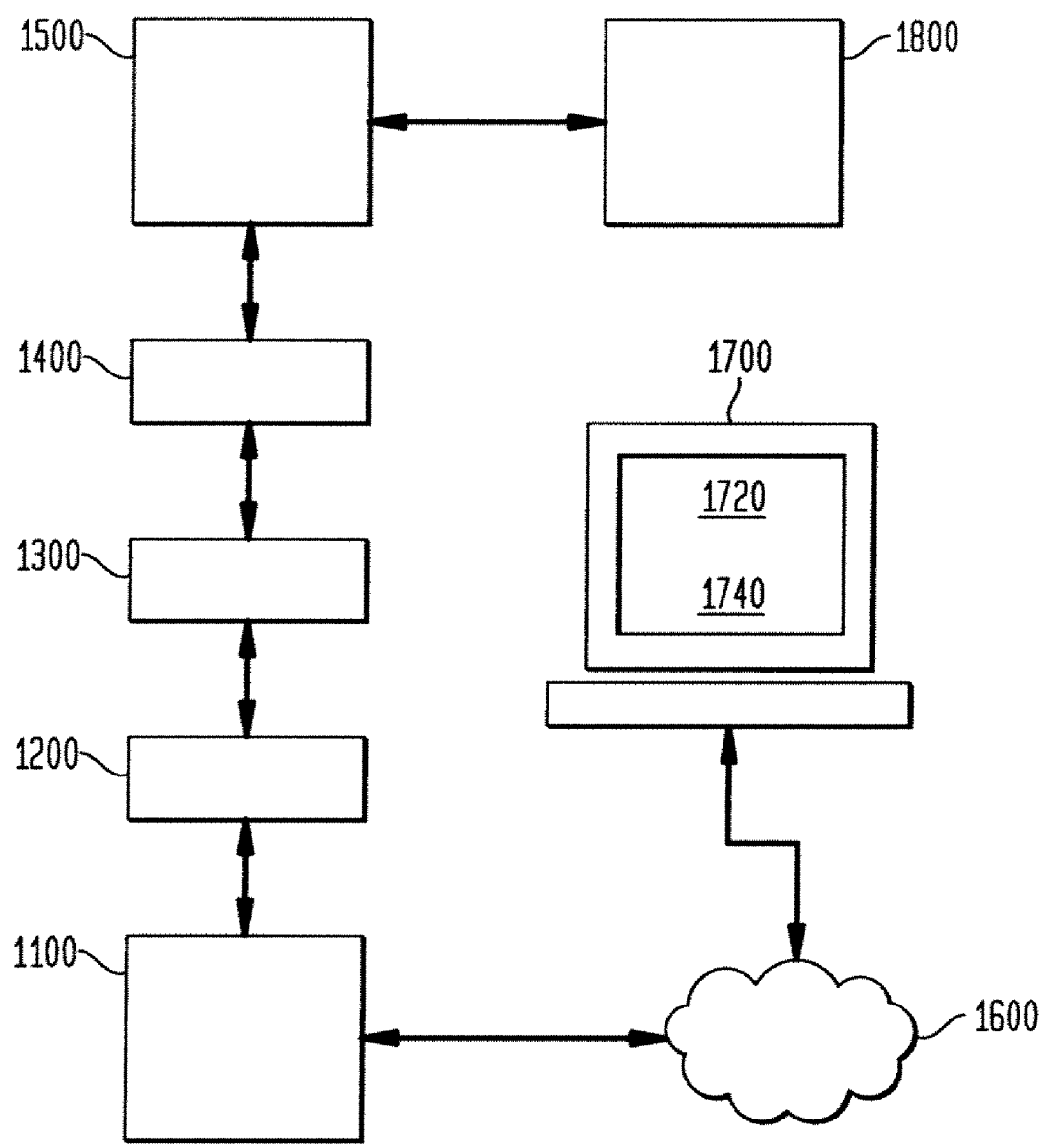
FIG. 1 is a block diagram of an exemplary embodiment of a system 1000.

FIG. 1 is a block diagram of an exemplary embodiment of a system 1000, which can comprise a programmable logic controller 1100. In certain exemplary embodiments, avoiding damage to programmable logic controller 1100 can be desirable. In order to resist a transmission of potentially damaging electrical energy, programmable logic controller 1100 can be communicatively coupled to one or more Input/Output (I/O) modules, such as I/O module 1500, via a first signal interface 1200, a second signal interface 1400, and an opto-coupler 1300. Opto-coupler 1300 can be adapted to electrically isolate programmable logic controller 1100 from I/O module 1500. Programmable logic controller 1100 can be communicatively coupled to an information device 1700 via a network 1600. Information device 1700 can comprise a user interface 1720 and a user program 1740. User program 1720 can be adapted to monitor and/or control activities of programmable logic controller 1100, such as transmitting signals to I/O module 1500. User interface 1720 can be adapted to generate, edit, and/or render information regarding user program 1720 and/or one or more activities of programmable logic controller 1100. I/O module 1500 can be adapted to cause an actuation of one or more input/output devices such as input/output device 1800.

First signal interface 1200 can be adapted to receive and integrate sub-signals from programmable logic controller 1100. Integrating sub-signals can reduce a count of opto-couplers, such as opto-coupler 1300 in exemplary systems. First signal interface 1200 can be adapted to decode signals from I/O module 1500. Opto-coupler 1300 can be adapted to electrically isolate programmable logic controller 1100 from I/O module 1500. Second signal interface 1400 can be adapted to decode integrated signals received from programmable logic controller 1100. Second signal interface 1400 can be adapted to integrate sub-signals from I/O module 1500 to form a signal adapted to be transmitted to programmable logic controller 1100 via opto-coupler 1300 and first signal interface 1200.

In certain exemplary embodiments, first signal interface 1200 can be adapted to transmit a signal between programmable logic controller 1100 and I/O module 1500. Programmable logic controller 1100 can be communicatively coupled to I/O module 1500 via opto-coupler 1300. The signal can comprise a clock sub-signal and an integrated control sub-signal. The clock sub-signal can be adapted to provide temporal information regarding the signal. The control sub-signal can be a framing signal indicative of a completion of a register transfer.

In certain exemplary embodiments, second signal interface 1400 can comprise a circuit adapted to recover the clock sub-signal and the control sub-signal from the signal. The circuit can be adapted to detect the control sub-signal via differentiation of short length pulses from pulses that have a longer length. Second signal interface 1400 can be adapted to recover an incoming clock sub-signal and/or an incoming control sub-signal from an incoming signal that comprises the incoming clock sub-signal integrated with the incoming control sub-signal.

Figure 2:
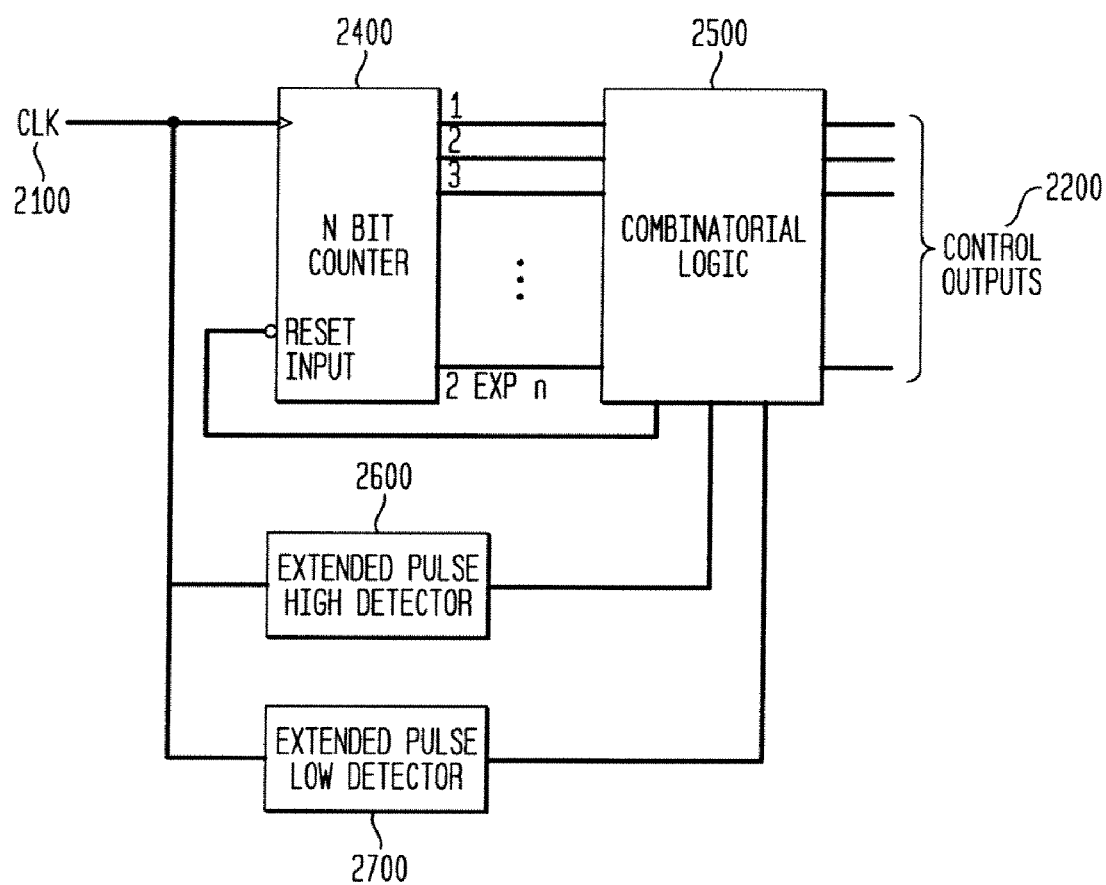
FIG. 2 is a block diagram of an exemplary embodiment of a system 2000.

FIG. 2 is a block diagram of an exemplary embodiment of a system 2000, which can comprise an N bit counter 2400, combinatorial logic 2500, an extended pulse high detector 2600, and an extended pulse low detector 2700. In certain exemplary embodiments, combinatorial logic 2500 can be adapted to integrate a control sub-signal within a serial clock sub-signal and/or recover control sub-signals from a received integrated signal. Integrated signals can be generated by combinatorial logic, a microprocessor, and/or other means. An integrated signal 2200 can be formed based upon a clock sub-signal 2100 and a control sub-signal that is obtained from N bit counter 2400. In certain exemplary embodiments, the signal can comprise a data sub-signal. The data sub-signal can comprise information from a register transfer.

Combinatorial logic, a microprocessor, and/or other means can be used to combine signals and recover the integrated control signals as well. For example, combinatorial logic 2500 and N bit counter 2400 can be adapted to integrate sub-signals to form a signal. N bit counter 2400 can be adapted to provide the clock sub-signal to combinatorial logic 2500. Combinatorial logic 2500 can combine an output of N bit counter 2400 with information from extended pulse high detector 2600 and extended pulse low detector 2700 to generate control outputs. Extended Pulse High/Low Detectors can differentiate normal length pulses from pulses which are of extended length to encode control signals. Combinatorial logic 2500 can be adapted to integrate the clock sub-signal and the control sub-signal to form the signal.

N bit Counter 2400 can be reset via an initiation signal 2300 at the end of the sequence by control logic in preparation for a next sequence of data. Combinatorial logic 2500 can be adapted to provide the initiation signal that resets N bit Counter 2400 at an end of the signal. In certain exemplary embodiments, a sequence of N (greater than one) clock pulses can have a control signal in the low state to be recovered. In certain exemplary embodiments, combinatorial logic 2500 and N bit counter 2400 can be eliminated for circuit simplicity and extended pulse low detector 2700 can be used to recover control signals.

Figure 3:
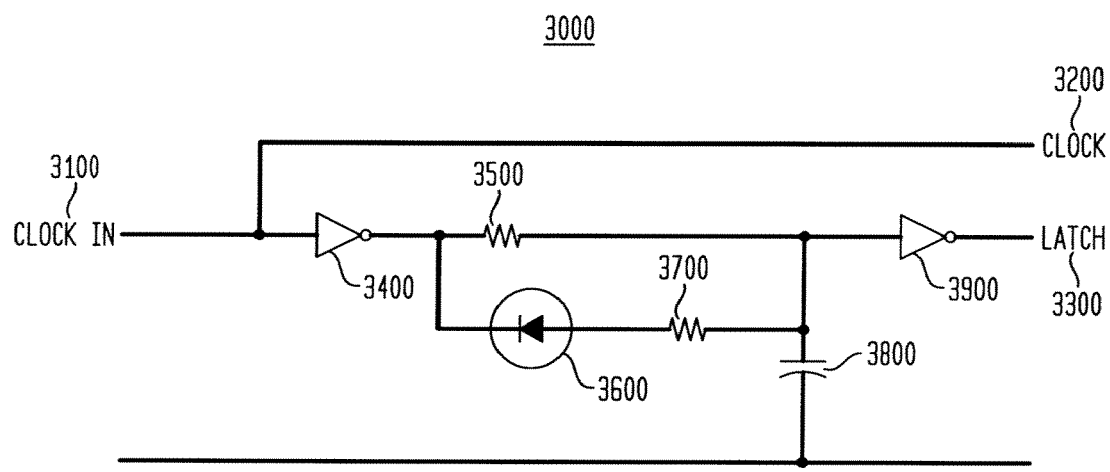
FIG. 3 is an electrical schematic diagram of an exemplary embodiment of a circuit 3000.

FIG. 3 is an electrical schematic diagram of an exemplary embodiment of a circuit 3000. Certain exemplary embodiments can integrate a control sub-signal (Latch) 3300 within a clock sub-signal 3200 (e.g., as an extended low as a last pulse of a 16 pulse sequence) to eliminate the additional circuitry (e.g., additional I/O, and in the case of isolated circuits isolation components such as opto-couplers) associated with control sub-signal 3300. Clock sub-signal 3200 can be passed on from circuit 3000.

In certain exemplary embodiments, control sub-signal (Latch) 3300 can be extracted from the signal 3100 by buffering clock sub-signal 3200 with a first inverter 3400 to prevent downstream circuitry from loading and/or distorting signal 3100, which might distort clock sub-signal 3200. Signal 3100 can then pass through a first resistor 3500 and a filter that comprises a second resistor 3700 and a capacitor 3800. If signal 3100 is low, capacitor 3800 can be adapted to charge through first resistor 3500. A diode 3600 can prevent second resistor 3700 from affecting a time constant of circuit 3000.

If clock sub-signal 3200 is high, a low is presented at the output of first inverter 3400. Diode 3600 can be forward biased and can rapidly discharge capacitor 3800 back to a low voltage state. Second inverter 3900 can be adapted to buffer control sub-signal 3300 and/or clean up sub-signal edges for driving subsequent logic.

The time constant of the RC filter formed by first resistor 3500 and capacitor 3800 can be chosen as several times a time period of a low clock. The time constant, in conjunction with the variation in the thresholds of the inverter gate, can produce a varying threshold which can range between up to 10 time constants. Depending on the physical implementation of certain exemplary embodiments (such as a comparator in place of first inverter 3400 and/or second inverter 3900), the time constant can be considerably different.

Figure 4:
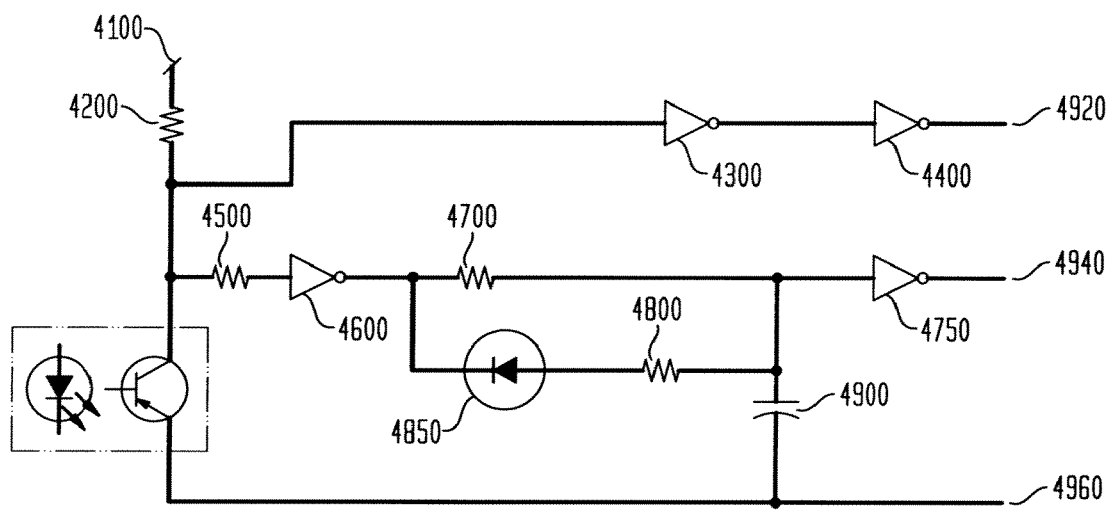
FIG. 4 is an electrical schematic diagram of an exemplary embodiment of a circuit 4000.

FIG. 4 is an electrical schematic diagram of an exemplary embodiment of a circuit 4000. Circuit 4000 can comprise:
- a voltage source 4100;
- an input resistance 4200;
- a first clock signal inverter 4300;
- a second clock signal inverter 4400;
- a signal input resistance 4500;
- a first signal inverter 4600;
- a first signal extraction resistance 4700;
- a second signal extraction resistance 4800;
- a diode 4850;
- a capacitor 4900;
- a second signal inverter 4750;
- a clock signal output 4920;
- a latch control output 4940; and/or
- a logic ground 4960.

Certain exemplary embodiments can eliminate the latch opto-couplers (one per channel, total 4) by integrating the latch function within the clock signal.

Circuit 4000 can perform this function. Certain exemplary embodiments can comprise two spare inverter gates per group. An additional cost might not be incurred by their usage. In certain exemplary embodiments, an additional cost associated with this circuit is due to the signal input resistance 4500 first signal extraction resistance 4700, second signal extraction resistance 4800, capacitor 4900, and diode 4850.

The time constant of the RC filter (6.8 uS) can be chosen as 6.8 times the time period of the low clock (1 uS). This time constant in conjunction with the variation in the thresholds of the 74 V/AHC gate produce a varying threshold which can range between approximately 3 and approximately 8 microseconds.

The latch signal can be recovered by holding the low clock condition for approximately 10 microseconds which will allow the capacitor to charge above the worst case low to high threshold of the inverter. The signal condition can be held for a minimum of approximately 10 microseconds to insure a valid low condition before transitioning the clock back high. This low period might not be susceptible to disruption by interrupts and the interrupts may be enabled during this period.

The time period for charging of the capacitor will be dependent on the low to high threshold of the gate, the variance in the time constant of the filter determined by the 6.8K resistor and the voltage applied to the circuit.

The time period for the discharge of the capacitor can be dependent on the voltage on the capacitor, the high to low threshold of the gate, and/or a variance in the time constant of the filter determined by the 6.8K resistor in parallel with the diode and 1K resistor. This period can be less than the charge time period and it is not deterministic in the generation of the latch signal. This time period can be less than approximately 1 microsecond.

Since circuit 4000 can be driven by a microprocessor output, certain exemplary embodiments might not utilize an interrupt during the first 15 low clock periods, as this could result in a low condition long enough to trip the latch output. The long low period at the end might not have interrupts disabled as they can lengthen the clock period but might not result in false triggers.

Each of Table I and Table II illustrate values for exemplary embodiments of system 4000.

TABLE I

Latch Period RC Voltage to VHC14 Input Analysis

| | Initial Value | | | | Diode | |
| --- | --- | --- | --- | --- | --- | --- |
| | Min | Nominal | Max | Tolerance | 1K | |
| R | 6666.667 | 6,800 | 6936 | 1% | | A5E00057370 |
| C | 9.80E−10 | 1.00E−09 | 1.02E−09 | 1% | | A5E00115142 |
| Tau | 6.54E−06 | 6.80E−06 | 7.07E−06 | 4.04% | | A5E00056010 |

| | Maximum Time Constant | | | Minimum Time Constant | | |
| --- | --- | --- | --- | --- | --- | --- |
| Vcc | 4.5 | 5 | 5.5 | 4.5 | 5 | 5.5 |
| V 1 uS | 0.64 | 0.68 | 0.72 | 0.64 | 0.71 | 0.78 |
| V 2 uS | 1.19 | 1.27 | 1.35 | 1.19 | 1.32 | 1.45 |
| V 3 uS | 1.66 | 1.78 | 1.90 | 1.66 | 1.84 | 2.02 |
| V 4 uS | 2.06** | 2.22** | 2.38** | 2.06** | 2.29** | 2.52** |
| V 5 uS | 2.41** | 2.60** | 2.79** | 2.41** | 2.67** | 2.94** |
| V 6 uS | 2.70** | 2.93** | 3.14** | 2.70** | 3.00** | 3.30** |
| V 7 uS | 2.96** | 3.21** | 3.46** | 2.96** | 3.29** | 3.62** |
| V 8 uS | 3.18 | 3.46** | 3.72** | 3.18 | 3.53 | 3.88 |
| V 9 uS | 3.36 | 3.67 | 3.96 | 3.36 | 3.74 | 4.11 |
| V 10 uS | 3.53 | 3.85 | 4.16 | 3.53 | 3.92 | 4.31 |
| V 11 uS | 3.66 | 4.01 | 4.34 | 3.66 | 4.07 | 4.48 |
| V 12 uS | 3.78 | 4.14 | 4.49 | 3.78 | 4.20 | 4.62 |
| V 13 uS | 3.88 | 4.26 | 4.62 | 3.88 | 4.32 | 4.75 |
| V 14 uS | 3.97 | 4.36 | 4.74 | 3.97 | 4.41 | 4.85 |
| V 15 uS | 4.05 | 4.45 | 4.84 | 4.05 | 4.50 | 4.95 |

| | National and Toshiba | | | | |
| --- | --- | --- | --- | --- | --- |
| | Vcc = 3 | Vcc = 4.5 | Vcc = 5 | Vcc = 5.3 | Vcc = 5.5 |
| 74VHC14 | <=85 | <=85 | <=85 | <=85 | <=85 |
| VT + max | 2.2 | 3.15* | 3.5* | 3.71 | 3.85* |
| VT + min | 1 | 1.75* | 2* | 2.15 | 2.25* |
| VT − max | 2.1 | 2.75 | 3 | 3.15 | 3.25 |

TABLE I-continued

| Latch Period RC Voltage to VHC14 Input Analysis | | | | | |
|---|---|---|---|---|---|
| VT − min | 0.9 | 1.35 | 1.5 | 1.59 | 1.65 |
| VH max | 1.2 | 1.4 | 1.5 | 1.56 | 1.6 |
| VH min | 0.3 | 0.4 | 0.45 | 0.48 | 0.5 |

Thresholds*
Transition**

TABLE II

| VHC 14 input voltage from RC filter Analysis WITHOUT Discharge Diode. | | | | | | | |
|---|---|---|---|---|---|---|---|
| | Min | Nominal | Max | Min | Nominal | Max | Tolerance |
| R | 6666.667 | 6,800 | 6936 | 6666.667 | 6,800 | 6936 | 1% |
| C | 9.80E−10 | 1.00E−09 | 1.02E−09 | 9.80E−10 | 1.00E−09 | 1.02E−09 | 1% |
| Tau | 6.54E−06 | 6.80E−06 | 7.07E−06 | 6.54E−06 | 6.80E−06 | 7.07E−06 | 4.04% |

| | Minimum Time Constant | | | Maximum Time Constant | | |
|---|---|---|---|---|---|---|
| Vcc | 4.5 | 5 | 5.5 | 4.5 | 5 | 5.5 |
| HC14 VOL | 0.05 | 0.1 | 0.2 | 0.05 | 0.1 | 0.2 |
| V 1 uS | 0.63 | 0.70 | 0.75 | 0.59 | 0.65 | 0.70 |
| V 2 uS | 0.55 | 0.61 | 0.67 | 0.52 | 0.57 | 0.63 |
| V 3 uS | 1.10 | 1.22 | 1.33 | 1.03 | 1.14 | 1.25 |
| V 4 uS | 0.95 | 1.06 | 1.17 | 0.90 | 1.01 | 1.11 |
| V 5 uS | 1.45 | 1.61 | 1.76 | 1.37 | 1.52 | 1.66 |
| V 6 uS | 1.25 | 1.39 | 1.53 | 1.20 | 1.33 | 1.47 |
| V 7 uS | 1.70* | 1.89* | 2.07 | 1.63 | 1.80 | 1.97 |
| V 8 uS | 1.47 | 1.64 | 1.80 | 1.42 | 1.58 | 1.74 |
| V 9 uS | 1.89 | 2.10 | 2.30* | 1.82 | 2.02 | 2.21 |
| V 10 uS | 1.63 | 1.82 | 2.00 | 1.59 | 1.76 | 1.94 |
| V 11 uS | 2.03 | 2.25 | 2.47 | 1.96* | 2.18* | 2.39 |
| V 12 uS | 1.75 | 1.95 | 2.15 | 1.71 | 1.90 | 2.10 |
| V 13 uS | 2.13 | 2.37 | 2.60 | 2.07 | 2.30 | 2.52* |
| V 14 uS | 1.84 | 2.04 | 2.26 | 1.81 | 2.01 | 2.21 |
| V 15 uS | 2.21 | 2.45 | 2.69 | 2.15 | 2.39 | 2.62 |

| | Vcc = 3 | Vcc = 4.5 | Vcc = 5 | Vcc = 5.3 | Vcc = 5.5 |
|---|---|---|---|---|---|
| 74VHC14 | <=85 | <=85 | <=85 | <=85 | <=85 |
| VT + max | 2.2 | 3.15* | 3.5* | 3.71 | 3.85* |
| VT + min | 1 | 1.75* | 2* | 2.15 | 2.25* |
| VT − max | 2.1 | 2.75 | 3 | 3.15 | 3.25 |
| VT − min | 0.9 | 1.35 | 1.5 | 1.59 | 1.65 |
| VH max | 1.2 | 1.4 | 1.5 | 1.56 | 1.6 |
| VH min | 0.3 | 0.4 | 0.45 | 0.48 | 0.5 |

Thresholds*
Transition**
With the discharge diode, the voltage is limited to that of the first two clock cycles.

Certain exemplary embodiments can use the combination of diode and resistor in parallel with a resistor such that the first 15 clock pulses do not charge the capacitor above the inverter input low to high threshold.

As seen in Table II the voltage on the capacitor may exceed the minimum input threshold although it will not exceed the maximum input threshold. The addition of the diode and series resistor sets the discharge time low enough to guarantee that the voltage does not exceed the lower threshold.

Circuit adapted 4000 can be adapted to cause an actuation of an output device according to control output 4940. Control output 4940 can be generated comprising a control signal in a low state. The control signal, which can be a latch signal, can be extracted from a sequence of N clock pulses. In certain exemplary embodiments, N can equal 16. In certain exemplary embodiments, the control signal can be extracted utilizing combinatorial logic. The sequence can contain the control signal. In certain exemplary embodiments, the signals can be buffered. The sequence can be received across a clock signal isolation boundary of a programmable logic controller. In certain exemplary embodiments, the received sequence can be combined with information received from a pulse detector, such as an Extended Pulse Low Detector. The sequence can be outputted from the circuit via a serially coupled pair of inverters, such as first clock signal inverter 4300 and second clock signal inverter 4400.

Figure 5:
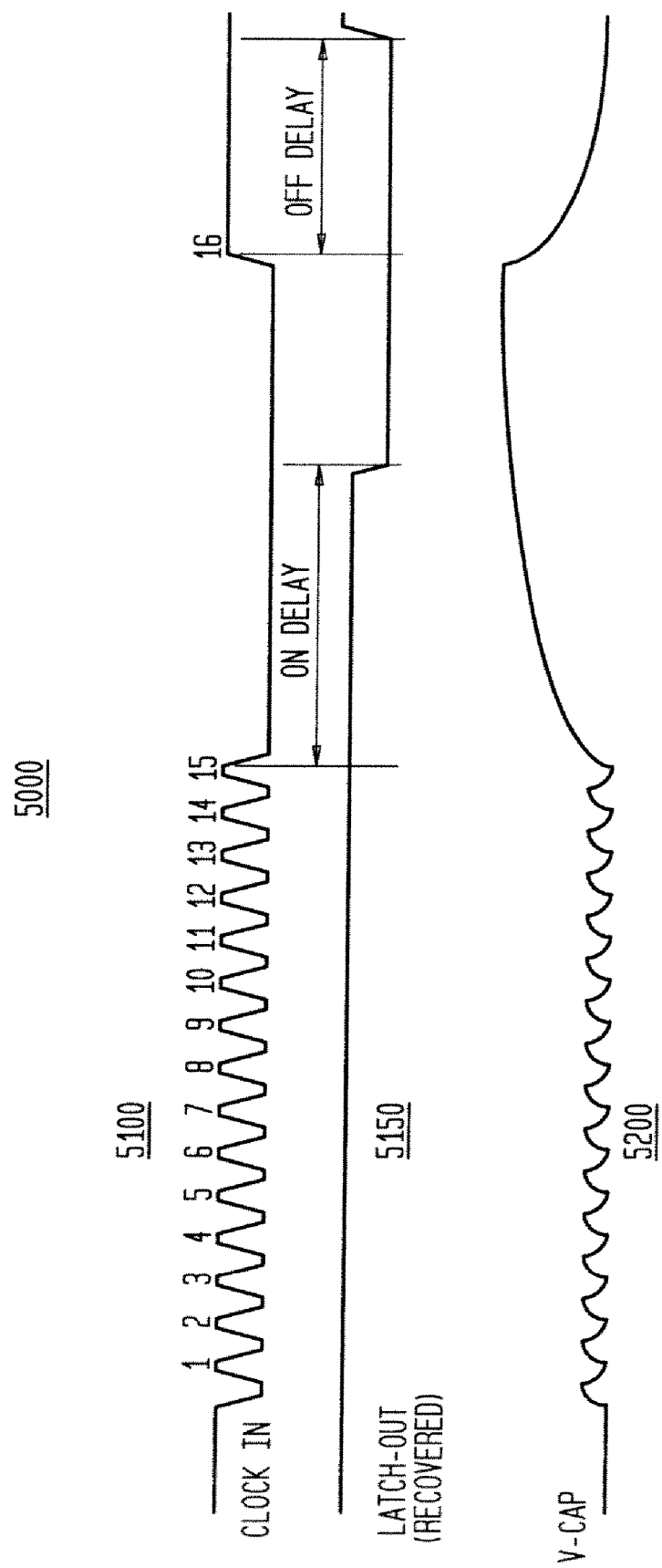
FIG. 5 is an exemplary embodiment of a set of signals 5000.

FIG. 5 is an exemplary embodiment of a set of signals 5000, which can comprise a first signal 5100, a second signal 5200, and a control sub-signal 5150. In certain exemplary embodiments, control sub-signal 5150 can be recovered by holding a low clock condition for an 'On Delay' of greater than 10 time constants which can allow a capacitor to charge above a worst case low to high threshold of an inverter. The low signal condition 'Off Delay' can be held for a minimum of 10 time constants to insure a valid low condition before transitioning the clock back high.

The time period for the discharge of the capacitor can be dependent on the voltage on the capacitor and the high to low threshold of a gate, in addition to the variance in the time constant of the filter. This period can be less than a charge time period, and can be held to greater than 10 time constants to insure enough time has passed for a signal interface circuit to stabilize at initial conditions before again performing a signal transfer.

Changing the diode direction can change the circuit from detecting extended low pulses to detecting extended high pulses. If the circuit is driven by a microprocessor output, interrupts might be avoided during the first 15 low clock periods, as this could result in a low condition long enough to trip the latch output. A long low period at an end of the signal might not have interrupts disabled since the clock period might be lengthened but false triggers might not be present.

In an exemplary embodiment, oscilloscope measurement of circuit 4000 in operation with a low clock period of approximately one microsecond and a high clock period of approximately two microseconds shows proper operation of the circuit.

Figure 6:
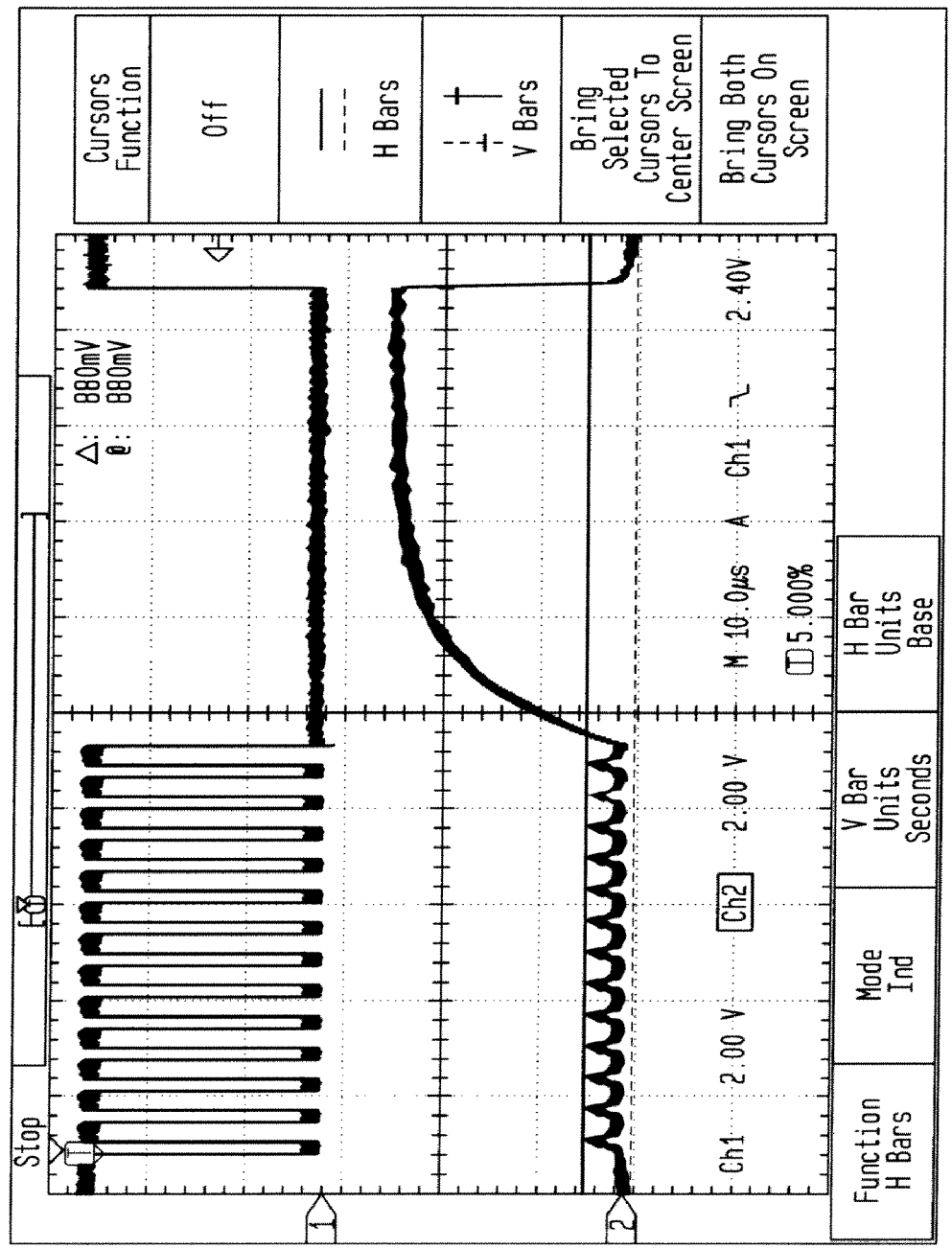
FIG. 6 is an exemplary embodiment of an oscilloscope output 6000.

FIG. 6 is an exemplary embodiment of an oscilloscope output 6000, which shows an input clock on top and the voltage on the capacitor on the bottom trace.

Figure 7:
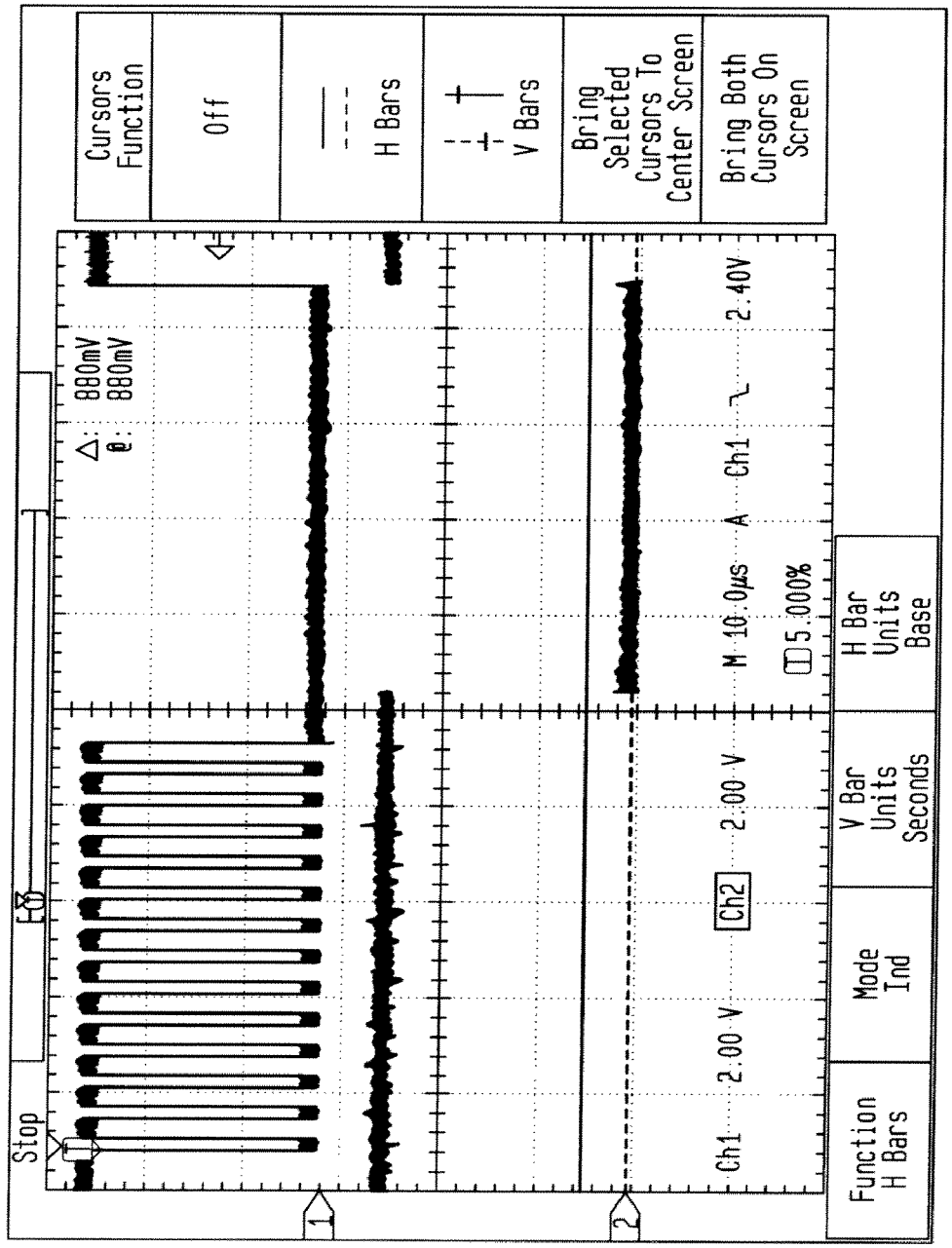
FIG. 7 is an exemplary embodiment of an oscilloscope output 7000.

FIG. 7 is an exemplary embodiment of an oscilloscope output 7000, which illustrates the output of the circuit based upon the input shown in FIG. 6.

Figure 8:
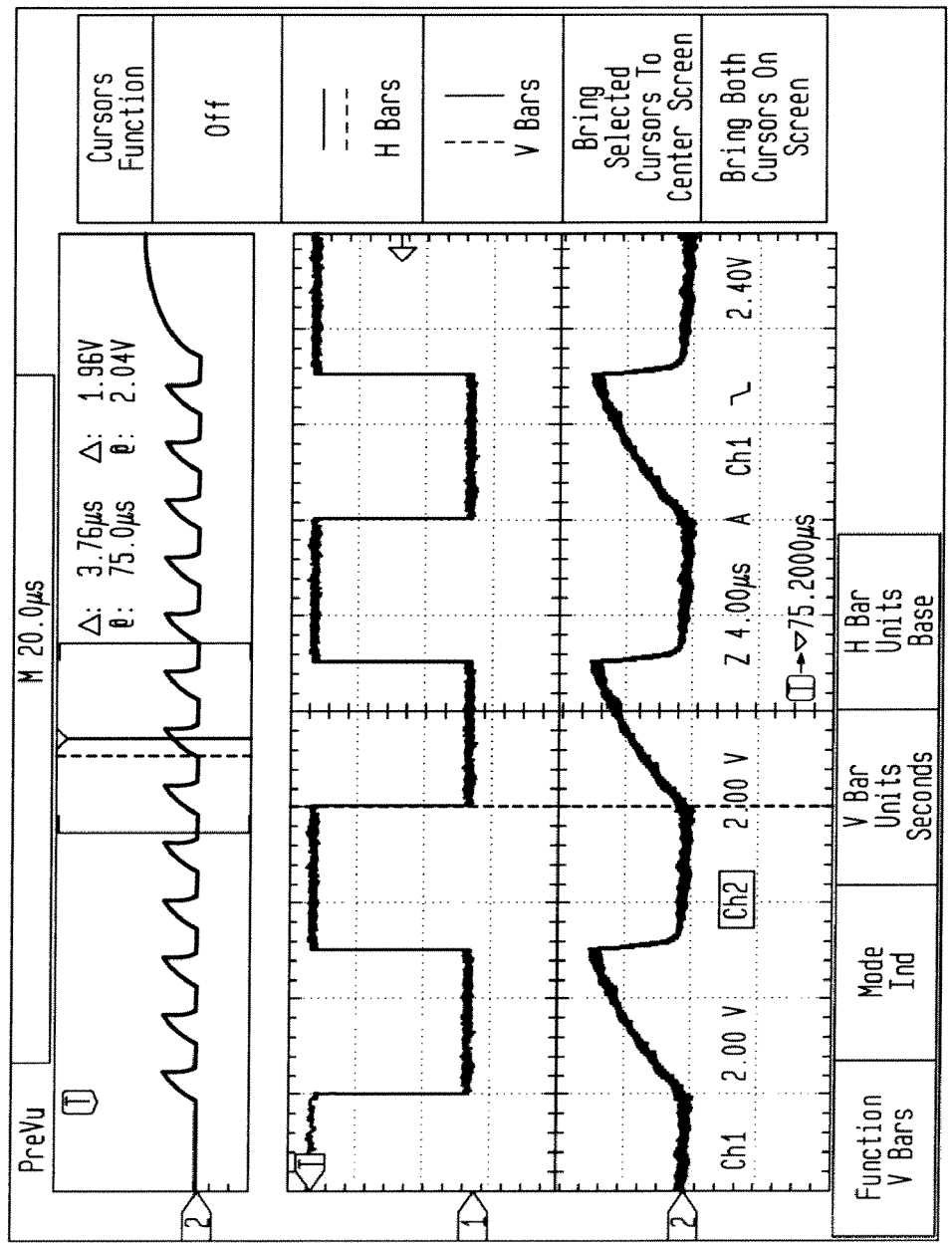
FIG. 8 is an exemplary embodiment of an oscilloscope output 8000.

FIG. 8 is an exemplary embodiment of an oscilloscope output 8000, which illustrates a voltage on the capacitor that is measured and plotted for a worst case threshold and timing of the output Inverter Gate. This confirms the time delay of approximately 3.76 microseconds to the minimum threshold of approximately 2 Volts as predicted by the design analysis as to occur between approximately 3 and approximately 4 microseconds.

Figure 9:
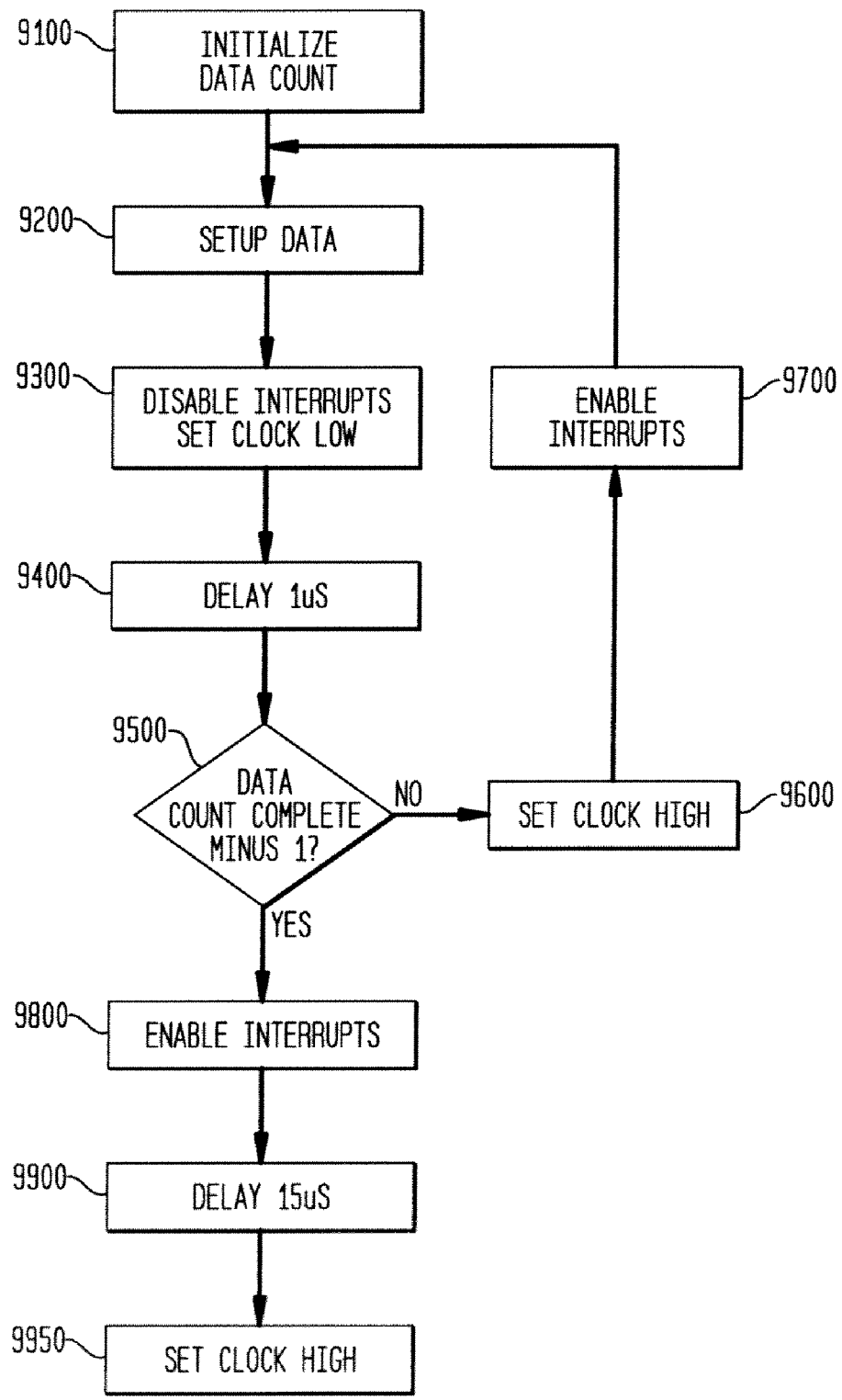
FIG. 9 is a flowchart of an exemplary embodiment of a method 9000.

FIG. 9 is a flowchart of an exemplary embodiment of a method 9000. At activity 9100, a data count can be initialized. At activity 9200, data can be setup. At activity 9300, interrupts can be disabled and a clock can be set to low. At activity 9400, a delay of approximately one microsecond can be introduced into a signal. At activity 9500, a determination can be made whether a data count is complete minus one. If the data count is not complete minus one, at activity 9600, the clock can be set to high and at activity 9700, interrupts can be enabled. If the data count is not complete minus one, at activity 9800 interrupts can be enabled. At activity 9900, a delay of approximately 15 microseconds can be introduced into the signal. At activity 9950, the clock can be set to high. The activities of method 9000 can prevent false triggers when using a microprocessor to drive the signals, where interrupts may interfere with operation otherwise.

Figure 10:
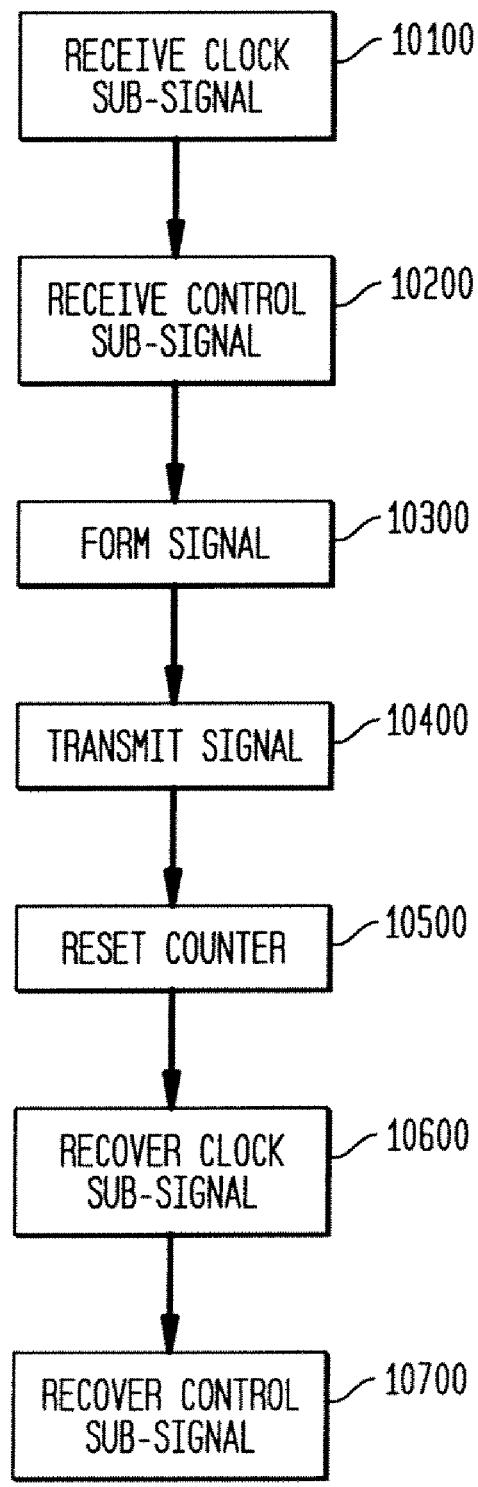
FIG. 10 is a flowchart of an exemplary embodiment of a method 10000.

FIG. 10 is a flowchart of an exemplary embodiment of a method 10000. Activities of method 10000 can be performed automatically and/or via machine-implementable instructions stored on a machine-readable medium that is executed on an information device. At activity 10100, a clock sub-signal can be received at a signal interface, which can be a circuit. The clock sub-signal can be adapted to provide temporal information regarding a signal.

At activity 10200, a control sub-signal can be received at the signal interface. The control sub-signal can be a framing signal indicative of a completion of a register transfer.

At activity 10300, a signal can be formed via an integration of the clock sub-signal and the control sub-signal. For example, the clock sub-signal and the control sub-signal can be integrated via combinatorial logic.

At activity 10400, the signal can be transmitted. Certain exemplary embodiments can cause a signal to be transmitted between a programmable logic controller and an Input/Output (I/O) module via the signal interface. The programmable logic controller can be adapted to use the signal to control a process. The programmable logic controller can be communicatively coupled to the I/O module via an opto-coupler. The signal can comprise the clock sub-signal and the integrated control sub-signal.

At activity 10500, a counter can be reset responsive to a determination that a transmission of the signal has been completed. The counter of the signal interface can be automatically reset responsive to an end of the signal.

At activity 10600, the clock sub-signal can be recovered from the signal. A circuit receiving the signal adapted to recover the clock sub-signal.

At activity 10700, the control sub-signal can be recovered from the signal. The circuit, which can be a pulse high detector or a pulse low detector, can be adapted to recover the control sub-signal from the signal. The circuit can be adapted to detect the control sub-signal via differentiation of short length pulses from pulses that have a longer length.

A control signal derived from the control sub-signal can be adapted to cause an actuation of an output device according to a control output that comprises the control signal. The control output can be generated comprising the control signal in a low state. The control signal, which can be a latch signal, can be extracted from a sequence of N clock pulses of the clock sub-signal. For example, the control signal can be extracted utilizing combinatorial logic and/or a microprocessor. In certain exemplary embodiments, N can equal 16. The sequence can contain the control signal. The sequence can be received across a clock signal isolation boundary of a programmable logic controller. The sequence outputted from the circuit via a serially coupled pair of inverters. The sequence can be received at the signal interface. The control output can be generated at the signal interface. In certain exemplary embodiments, the control signal can be embedded in the sequence of N clock pulses. In certain exemplary embodiments, the sequence of N clock pulses can be buffered. In certain exemplary embodiments, the received sequence can be combined with information received from a pulse detector, such as an Extended Pulse Low Detector.

Figure 11:
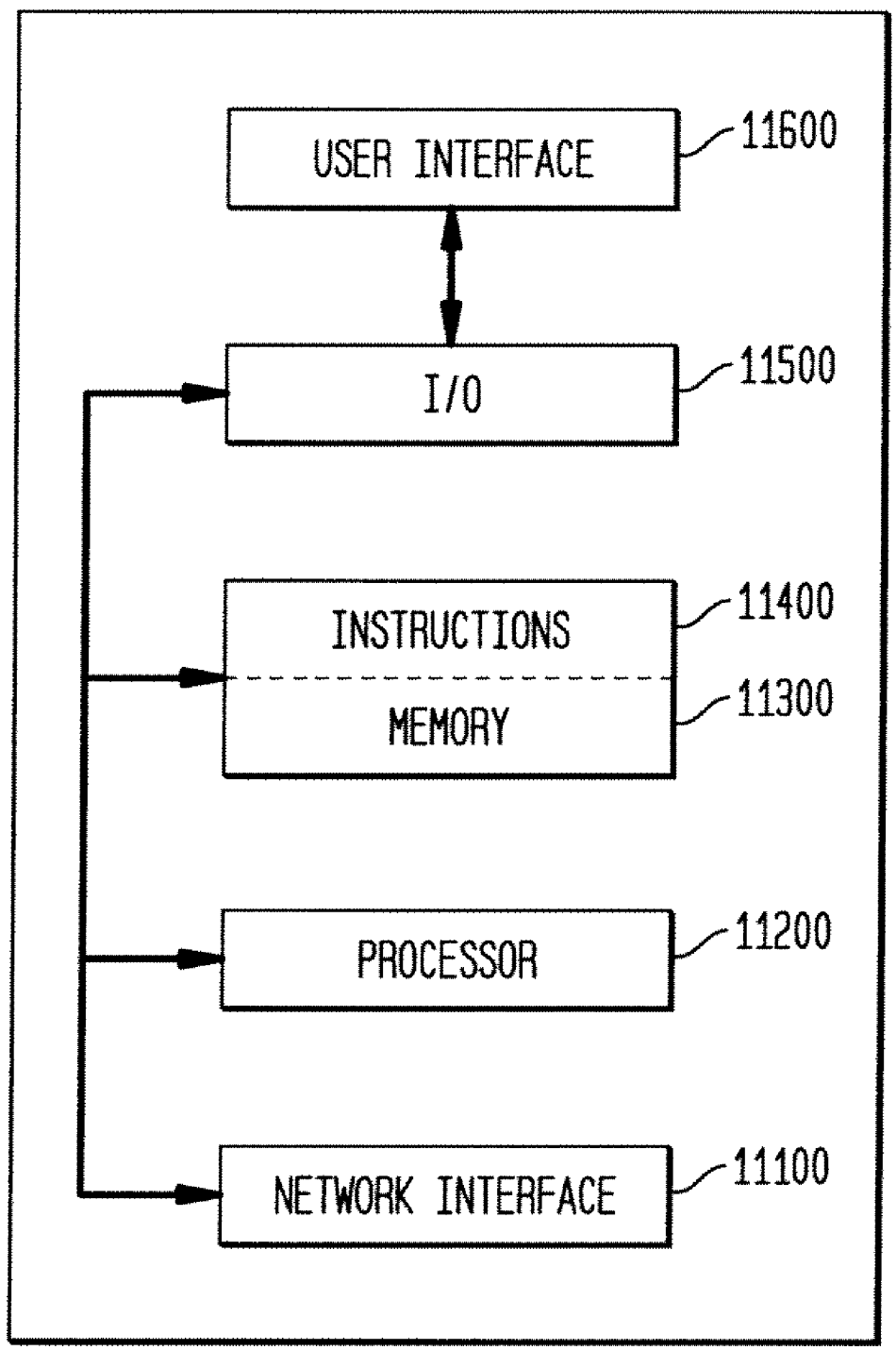
FIG. 11 is a block diagram of an exemplary embodiment of an information device 11000.

FIG. 11 is a block diagram of an exemplary embodiment of an information device 11000, which in certain operative embodiments can comprise, for example, first signal interface 1200 and/or second signal interface 1400 of FIG. 1. Information device 11000 can comprise any of numerous circuits and/or components, such as for example, one or more network interfaces 11100, one or more processors 11200, one or more memories 11300 containing instructions 11400, one or more input/output (I/O) devices 11500, and/or one or more user interfaces 11600 coupled to I/O device 11500, etc.

In certain exemplary embodiments, via one or more user interfaces 11600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein.

DEFINITIONS

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

ability—a quality of being able to perform.

accept—to receive.

access—(n) a permission, liberty, right, mechanism, or ability to enter, approach, communicate with and/or through, make use of, and/or pass to and/or from a place, thing, and/or person. (v) to enter, approach, communicate with and/or through, make use of, and/or pass to and/or from.

according—agreeing with.

across—from one side to another.

activity—an action, act, deed, function, step, and/or process and/or a portion thereof.

actuation—a physical movement of a device and/or system.

actuator—a device that converts, translates, and/or interprets signals (e.g., electrical, optical, hydraulic, pneumatic, etc.) to cause a physical and/or humanly perceptible action and/or output, such as a motion (e.g., rotation of a motor shaft, vibration, position of a valve, position of a solenoid, position of a switch, and/or position of a relay, etc.), audible sound (e.g., horn, bell, and/or alarm, etc.), and/or visible rendering (e.g., indicator light, non-numerical display, and/or numerical display, etc).

adapted to—suitable, fit, and/or capable of performing a specified function.

and/or—either in conjunction with or in alternative to.

another—an additional one.

apparatus—an appliance or device for a particular purpose.

associated with—related to.

at least—not less than.

automatic—performed via an information device in a manner essentially independent of influence and/or control by a user.

automatically—acting and/or operating in a manner essentially independent of external human influence and/or control. For example, an automatic light switch can turn on upon "seeing" a person in its view, without the person manually operating the light switch.

available—present and/or ready for use.

between—in a separating interval and/or intermediate to.

buffer—(n.) a circuit with a single output activated by one or more inputs; (v.) to activate a circuit with a single output via one or more inputs.

can—is capable of, in at least some embodiments.

cause—to bring about, provoke, precipitate, produce, elicit, be the reason for, result in, and/or effect.

change—(v.) to cause to be different; (n.) the act, process, and/or result of altering or modifying.

circuit—an electrically conductive pathway and/or a communications connection established across two or more switching devices comprised by a network and between corresponding end systems connected to, but not comprised by the network.

clock pulse—a transient variation of a quantity (such as electric current or voltage) whose value is otherwise constant that conveys temporal information regarding a device and/or system.

clock sub-signal—pulsed electrical energy that conveys temporal information regarding a device and/or system.

combinatorial—adapted to combine sub-signals into a signal.

combine—to join together.

command—a signal that initiates an operation defined by an instruction.

communicate—to exchange information.

communication—a transmission and/or exchange of information communicatively—linking in a manner that facilitates communications.

comparison—an act of examining resemblances and/or differences.

completion—a concluding action.

component—a constituent element and/or part.

comprise—to include but not be limited to.

comprised by—included by.

contain—to hold or keep within limits; restrain.

control—(n) a mechanical or electronic device used to operate a machine within predetermined limits; (v) to exercise authoritative and/or dominating influence over, cause to act in a predetermined manner, direct, adjust to a requirement, and/or regulate.

control signal—a signal used for directing and/or exercising authoritative and/or dominating influence over an entity, such as a user load.

control sub-signal—pulsed electrical energy that conveys status and/or instructional information regarding a data transfer operation.

count—(n.) a number reached by counting and/or a defined quantity; (v.) to increment, typically by one and beginning at zero.

counter—a device and/or system configured to count.

couple—to join, connect, and/or link two things together.

current—contemporaneous to the present time.

data—information represented in a form suitable for processing by an information device.

data structure—an organization of a collection of data that allows the data to be manipulated effectively and/or a logical relationship among data elements that is designed to support specific data manipulation functions. A data structure can comprise meta data to describe the properties of the data structure. Examples of data structures can include array, dictionary, graph, hash, heap, linked list, matrix, object, queue, ring, stack, tree, and/or vector.

deadline—a time interval during which an activity's completion has more utility to a system, and after which the activity's completion has less utility. Such a time interval might be constrained only by an upper-bound, or it might be constrained by both upper and lower bounds.

detect—to sense, perceive identify, discover, ascertain, respond to, and/or receive the existence, presence, and/or fact of.

detector—a device adapted to sense or perceive.

determine—to find out or come to a decision about by investigation, reasoning, or calculation.

device—a machine, manufacture, and/or collection thereof.

difference—a point of unlikeness and/or dissimilarity.

differentiation—a determination of one or more dissimilarities.

distinct—discrete and/or readily distinguishable from all others.

each—every one of a group considered individually.

embed—to insert and/or incorporate into.

end—an extremity and its vicinity of something that has length; a terminus.

equal—substantially the same as.

Extended Pulse Low Detector—a device and/or system adapted to determine when a measured amplitude of pulsed of electrical energy is below a predetermined threshold for at least a predetermined time interval.

extract—to draw out from and/or determine based upon.

for—with a purpose of.

form—to compose, create, and/or generate.

frame—a data transmission signal structure that comprises address information, control information, and/or one or more markers indicative of a beginning and/or end of transmitted data.

from—used to indicate a source.

further—in addition.

generate—to create, produce, render, give rise to, and/or bring into existence.

hard deadline—the special case where completing an activity within the deadline results in the system receiving all the utility possible from that activity, and completing the activity outside of the deadline results in zero utility (i.e., resources consumed by the activity were wasted, such as when one travels to the beach to photograph a sunrise on a particular day and arrives after the sun has already arisen) or some negative value of utility (i.e., the activity was counter-productive, such as when firefighters enter a burning building to search for a missing person seconds before the building collapses, resulting in injury or death to the firefighters). The scheduling criterion for a hard deadline is to always meet the hard deadline, even if it means changing the activity to do so.

hard real-time—relating to computer systems that provide an absolute deterministic response to an event. Such a response is not based on average event time. Instead, in such computer systems, the deadlines are fixed and the system must guarantee a response within a fixed and well-defined time. Systems operating in hard real-time typically interact at a low level with physical hardware via embedded systems, and can suffer a critical failure if time constraints are violated. A classic example of a hard real-time computing system is the anti-lock brakes on a car. The hard real-time constraint, or deadline, in this system is the time in which the brakes must be released to prevent the wheel from locking. Another example is a car engine control system, in which a delayed control signal might cause engine failure or damage. Other examples of hard real-time embedded systems include medical systems such as heart pacemakers and industrial process controllers.

if—in case that.

incoming—entering a system from an external source.

indicative—serving to indicate.

information—facts, terms, concepts, phrases, expressions, commands, numbers, characters, and/or symbols, etc., that are related to a subject. Sometimes used synonymously with data, and sometimes used to describe organized, transformed, and/or processed data. It is generally possible to automate certain activities involving the management, organization, storage, transformation, communication, and/or presentation of information.

information device—any device on which resides a finite state machine capable of implementing at least a portion of a method, structure, and/or or graphical user interface described herein. An information device can comprise well-known communicatively coupled components, such as one or more network interfaces, one or more processors, one or more memories containing instructions, one or more input/output (I/O) devices, and/or one or more user interfaces (e.g., coupled to an I/O device) via which information can be rendered to implement one or more functions described herein. For example, an information device can be any general purpose and/or special purpose computer, such as a personal computer, video game system (e.g., PlayStation, Nintendo Gameboy, X-Box, etc.), workstation, server, minicomputer, mainframe, supercomputer, computer terminal, laptop, wearable computer, and/or Personal Digital Assistant (PDA), iPod, mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, a digital signal processor, an ASIC or other integrated circuit, a hardware electronic logic circuit such as a discrete element circuit, and/or a programmable logic device such as a PLD, PLA, FPGA, or PAL, or the like, etc.

initially—at a beginning initiation signal—electrical energy that is adapted to cause a counter to be reset.

input—a signal, data, and/or information provided to a processor, device, and/or system.

Input/Output (I/O) device—an input/output (I/O) device of an information device can be any sensory-oriented input and/or output device, such as an audio, visual, haptic, olfactory, and/or taste-oriented device including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

Input/Output module—a device and/or system adapted to receive and/or forward information between a programmable logic controller (PLC) and a predetermined set of sensors and/or actuators.

integrate—to form or unite into a whole or into another entity.

interface—(n) a boundary across which two independent systems meet and act on and/or communicate with each other. (v) to connect with and/or interact with by way of an interface.

into—to a condition, state, or form of.

inverter—a logic gate which changes an inputted binary digital signal to an outputted binary digital signal with an opposite binary state to that of the inputted binary digital signal.

isolation boundary—an interface in an electrical circuit that is adapted to resist transmission of signals having a voltage and/or current amplitude that is above a predetermined threshold.

latch—(n) that which releasably fastens and/or holds; (v) to releasably fasten and/or hold.

longer length—a time duration that is greater than three time constants of a resistance/capacitance (RC) filter adapted to filter a signal.

low state—a logical signal level that is interpretable as being less than a high state.

machine-implementable instructions—directions adapted to cause a machine, such as an information device, to perform one or more particular activities, operations, and/or functions. The directions, which can sometimes form an entity called a "processor", "kernel", "operating system", "program", "application", "utility", "subroutine", "scripts", "macro", "file", "project", "module", "library", "class", and/or "object", etc., can be embodied as machine code source code, object code, compiled code, assembled code, interpretable code, and/or executable code, etc., in hardware, firmware, and/or software.

machine-readable medium—a physical structure from which a machine, such as an information device, computer, microprocessor, and/or controller, etc., can obtain and/or store data, information, and/or instructions. Examples include memories, punch cards, and/or optically-readable forms, etc.

made—produced.

may—is allowed and/or permitted to, in at least some embodiments.

memory—a device capable of storing analog or digital information, for example, a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory can be coupled to a processor and can store instructions adapted to be executed by processor according to an embodiment disclosed herein.

method—a process, procedure, and/or collection of related activities for accomplishing something.

microprocessor—a device adapted to perform one or more predetermined tasks, such as acting upon information by manipulating analyzing, modifying, converting, transmitting the information for use by an executable procedure and/or an information device, and/or routing the information to an output device. A microprocessor can be a central processing unit, a local controller, a remote controller, parallel controller, and/or distributed controller, etc. The microprocessor can be a general-purpose microcontroller, such the Pentium IV series of microprocessor manufactured by the Intel Corporation of Santa Clara, Calif. In another embodiment, the microprocessor can be an Application Specific Integrated Circuit (ASIC) or a Field Programmable Gate Array (FPGA) that has been designed to implement in its hardware and/or firmware at least a part of an embodiment disclosed herein.

modify—to change, cause to change, edit, alter, replace, delete, and/or correct.

module—a device adapted to be communicatively coupled to a predetermined set of information devices, input/output devices, sensors, and/or actuators.

more—additional.

network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, Fast Ethernet, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any physical and/or logical device, system, and/or process capable of coupling an information device to a network. Exemplary network interfaces comprise a telephone, cellular phone, cellular modem, telephone data modem, fax modem, wireless transceiver, Ethernet card, cable modem, digital subscriber line interface, bridge, hub, router, or other similar device, software to manage such a device, and/or software to provide a function of such a device.

obtain—to receive, get, take possession of, procure, acquire, calculate, determine, and/or compute.

opto-coupler—a device that uses an optical transmission path to transfer a signal between a first element and a second element of a circuit, the device adapted to substantially electrically isolate the first element from the second element since the signal goes from an electrical signal to an optical signal back to an electrical signal such that electrical continuity along a path between the first element and the second elements is substantially broken.

output—(n) something produced and/or generated; data produced by an information device executing machine-readable instructions; and/or the energy, power, work, signal, and/or information produced by a system; (v) to provide, produce, manufacture, and/or generate.

output device—an actuator.

plurality—the state of being plural and/or more than one.

predetermined—established in advance.

process—(n.) an organized series of actions, changes, and/or functions adapted to bring about a result. (v.) to perform mathematical and/or logical operations according to programmed instructions in order to obtain desired information and/or to perform actions, changes, and/or functions adapted to bring about a result.

processor—a hardware, firmware, and/or software machine and/or virtual machine comprising a set of machine-readable instructions adaptable to perform a specific task. A processor can utilize mechanical, pneumatic, hydraulic, electrical, magnetic, optical, informational, chemical, and/or biological principles, mechanisms, signals, and/or inputs to perform the task(s). In certain embodiments, a processor can act upon information by manipulating, analyzing, modifying, and/or converting it, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

programmable logic controller (PLC)—a solid-state, microprocessor-based, hard real-time computing system that is used, via a network, to automatically monitor the status of field-connected sensor inputs, and automatically control communicatively-coupled devices of a controlled industrial system (e.g., actuators, solenoids, relays, switches, motor starters, speed drives (e.g., variable frequency drives, silicon-controlled rectifiers, etc.), pilot lights, igniters, tape drives, speakers, printers, monitors, displays, etc.) according to a user-created set of values and user-created logic and/or instructions stored in memory. The sensor inputs reflect measurements and/or status information related to the controlled industrial system. A PLC provides any of: automated input/output control; switching; counting; arithmetic operations; complex data manipulation; logic; timing; sequencing; communication; data file manipulation; report generation; control; relay control; motion control; process control; distributed control; and/or monitoring of processes, manufacturing equipment, and/or other automation of the controlled industrial system. Because of its precise and hard real-time timing and sequencing capabilities, a PLC is programmed using ladder logic or some form of structured programming language specified in IEC 61131-3, namely, FBD (Function Block Diagram), LD (Ladder Diagram), ST (Structured Text, Pascal type language), IL (Instruction List) and/or SFC (Sequential Function Chart). Because of its precise and real-time timing and sequencing capabilities, a PLC can replace up to thousands of relays and cam timers. PLC hardware often has good redundancy and fail-over capabilities. A PLC can use a Human-Machine Interface (HMI) for interacting with users for configuration, alarm reporting, and/or control.

provide—to furnish, supply, give, convey, send, and/or make available.

pulse—a transient variation of a quantity (such as electric current or voltage) whose value is otherwise constant. Sometimes repeated with a regular period and/or according to some code.

pulse high detector—a device and/or system adapted to recognize an electrical signal having an amplitude that is above a predetermined threshold.

pulse low detector—a device and/or system adapted to recognize an electrical signal having an amplitude that is below a predetermined threshold.

real-time—a system (or sub-system) characterized by time constraints on individual activities and scheduling criteria for using those time constraints to achieve acceptable system timeliness with acceptable predictability.

receive—to gather, take, acquire, obtain, accept, get, and/or have bestowed upon.

recover—to derive, determine, and/or deduce information from a received signal.

regarding—pertaining to.

register transfer—a conveyance of a predetermined set of information from a first memory to an information device and/or second memory.

render—to display, annunciate, speak, print, and/or otherwise make perceptible to a human, for example as data, commands, text, graphics, audio, video, animation, and/or hyperlinks, etc., such as via any visual, audio, and/or haptic mechanism, such as via a display, monitor, printer, electric paper, ocular implant, cochlear implant, speaker, etc.

request—(v.) to express a need and/or desire for; to inquire and/or ask for. (n.) that which communicates an expression of desire and or that which is asked for.

reset—a control adapted to clear a first set of data and begin collecting a second set of data.

respond—to reply.

response—a reply and/or answer.

responsive—reacting to an influence and/or impetus.

said—when used in a system or device claim, an article indicating a subsequent claim term that has been previously introduced.

second—an element that immediately follows an initial element of a series.

selected—a chosen item.

send—to convey, dispatch, and/or transmit.

sensor—a device adapted to automatically sense, perceive, detect, and/or measure a physical property (e.g., pressure, temperature, flow, mass, heat, light, sound, humidity, proximity, position, velocity, vibration, loudness, voltage, current, capacitance, resistance, inductance, and/or electro-magnetic radiation, etc.) and convert that physical quantity into a signal. Examples include proximity switches, stain gages, photo sensors, thermocouples, level indicating devices, speed sensors, accelerometers, electrical voltage indicators, electrical current indicators, on/off indicators, and/or flowmeters, etc.

sequence—an ordered set.

serially coupled—a group of items electrically connected such that an electrical current conducted through one item is conducted through each item.

set—(n). related plurality of predetermined elements; and/or one or more distinct items and/or entities having a specific common property or properties. (v) to establish a value.

short length—a time duration that is less than three time constants of a resistance/capacitance (RC) filter adapted to filter a signal.

signal—information, such as machine-implementable instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

soft deadline—the general case where completing an activity by a deadline results in a system receiving a utility measured in terms of lateness (completion time minus deadline), such that there exist positive lateness values corresponding to positive utility values for the system. Lateness can be viewed in terms of tardiness (positive lateness), or earliness (negative lateness). Generally, and potentially within certain bounds, larger positive values of lateness or tardiness represent lower utility, and larger positive values of earliness represent greater utility.

soft real-time—relating to computer systems that take a best efforts approach and minimize latency from event to response as much as possible while keeping throughput up with external events overall. Such systems will not suffer a critical failure if time constraints are violated. For example, live audio-video systems are usually soft real-time; violation of time constraints can result in degraded quality, but the system can continue to operate. Another example is a network server, which is a system for which fast response is desired but for which there is no deadline. If the network server is highly loaded, its response time may slow with no failure in service. This is contrasted with an anti-lock braking system where a slow down in response would likely cause system failure, possibly even catastrophic failure.

substantially—to a considerable, large, and/or great, but not necessarily whole and/or entire, extent and/or degree.

system—a collection of mechanisms, devices, machines, articles of manufacture, processes, data, and/or instructions, the collection designed to perform one or more specific functions.

temporal—regarding a creation and/or modification date and/or time.

transmit—to provide, furnish, supply, send as a signal, and/or to convey (e.g., force, energy, and/or information) from one place and/or thing to another.

use—to put into service.

used—employed in accomplishing something.

user interface—a device and/or software program for rendering information to a user and/or requesting information from the user. A user interface can include at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

utilize—to use and/or put into service.

value—a measured, assigned, determined, and/or calculated quantity or quality for a variable and/or parameter.

via—by way of and/or utilizing.

wherein—in regard to which; and; and/or in addition to.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive.

What is claimed is:

1. A system comprising:
a circuit adapted to cause an actuation of an output device according to a control output, said control output generated comprising a control signal in a low state, said control signal extracted from a sequence of N clock pulses, said sequence containing said control signal, said sequence received across a clock signal isolation boundary of a programmable logic controller, said sequence outputted from said circuit via a serially coupled pair of inverters.

2. The system of claim 1, wherein:
said control signal is embedded in said sequence of N clock pulses.

3. The system of claim 1, wherein:
said sequence of N clock pulses is buffered.

4. The system of claim 1, wherein:
said received sequence is combined with information received from a pulse detector.

5. The system of claim 1, wherein:
said received sequence is combined with information received from an Extended Pulse Low Detector.

6. The system of claim 1, wherein:
said control signal is a latch signal.

7. The system of claim 1, wherein:
N equals 16.

8. The system of claim 1, wherein:
said control signal is extracted utilizing combinatorial logic.

9. A method comprising:
causing an actuation of an output device according to a control output, said control output generated comprising a control signal in a low state, said control signal extracted from a sequence of N clock pulses, said sequence containing said control signal, said sequence received across a clock signal isolation boundary of a programmable logic controller, said sequence outputted from said circuit via a serially coupled pair of inverters.

10. The method of claim 9, further comprising:
receiving said sequence.

11. Said method of claim 9, further comprising:
extracting said control signal from said sequence.

12. The method of claim 9, further comprising:
generating said control output.

13. The method of claim 9, further comprising:
embedding said control signal in said sequence of N clock pulses.

14. The method of claim 9, further comprising:
buffering said sequence of N clock pulses.

15. The method of claim 9, further comprising:
combining said received sequence with information received from a pulse detector.

16. The method of claim 9, further comprising:
combining said received sequence with information received from an Extended Pulse Low Detector.

17. The method of claim 9, further comprising:
said control signal is a latch signal.

18. The method of claim 9, further comprising:
N equals 16.

19. The method of claim 9, further comprising:
said control signal is extracted utilizing combinatorial logic.

20. The method of claim 9, further comprising:
said control signal is extracted utilizing a microprocessor.

21. A machine-readable medium comprising machine-implementable instructions for activities comprising:
causing an actuation of an output device according to a control output, the control output generated comprising a control signal in a low state, the control signal extracted from a sequence of N clock pulses, the sequence containing the control signal, the sequence received across a clock signal isolation boundary of a programmable logic controller, said sequence outputted from said circuit via a serially coupled pair of inverters.

* * * * *